(12) United States Patent
Lynch

(10) Patent No.: US 7,313,803 B1
(45) Date of Patent: Dec. 25, 2007

(54) RATINGS CONTROL SYSTEM WITH TEMPORARY OVERRIDE CAPABILITY AND STORE-RECALL FEATURE

(75) Inventor: David Johnston Lynch, Hamilton, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 09/475,449

(22) Filed: Dec. 30, 1999

(51) Int. Cl.
*H04N 7/16* (2006.01)
*G06F 3/00* (2006.01)

(52) U.S. Cl. .......................... 725/25; 725/26; 725/27; 725/28; 725/38; 725/55

(58) Field of Classification Search ............... 725/27, 725/28, 29, 30, 31, 25, 26, 46, 131, 139, 725/151, 38, 55
See application file for complete search history.

(56) References Cited

U.S. PATENT DOCUMENTS

| | | | | |
|---|---|---|---|---|
| 5,465,113 A * | 11/1995 | Gilboy | ........................ | 725/29 |
| 5,828,402 A * | 10/1998 | Collings | ....................... | 725/28 |
| 5,969,748 A * | 10/1999 | Casement et al. | ............ | 725/27 |
| 5,973,683 A * | 10/1999 | Cragun et al. | .............. | 345/719 |
| 5,995,133 A * | 11/1999 | Kim | ............................ | 725/28 |
| 6,020,882 A * | 2/2000 | Kinghorn et al. | ........... | 345/716 |
| 6,025,869 A * | 2/2000 | Stas et al. | ...................... | 725/28 |
| 6,100,916 A * | 8/2000 | August et al. | ................ | 725/28 |
| 6,125,259 A * | 9/2000 | Perlman | ....................... | 725/28 |
| 6,137,486 A * | 10/2000 | Yoshida et al. | ............. | 345/719 |
| 6,230,320 B1 * | 5/2001 | Gakumura | .................... | 725/25 |
| 6,701,523 B1 * | 3/2004 | Hancock et al. | .............. | 725/25 |
| 2002/0013941 A1 * | 1/2002 | Ward et al. | ................... | 725/25 |

FOREIGN PATENT DOCUMENTS

WO    WO99/44361    9/1999

* cited by examiner

*Primary Examiner*—Kieu-Oanh Bui
(74) *Attorney, Agent, or Firm*—Joseph J. Laks; Robert D. Shedd

(57) ABSTRACT

A video signal processing system for producing an output signal suitable for coupling to a display device to produce a displayed image, the video processing system having a system which blocks viewing of programs which are broadcast with ratings or spending information which is outside a profile set by a supervisor who has entered a password accepted by the control system, and which permits the supervisor to temporarily modify the ratings profile according to a set of override parameters. After completion of the time period(s) or supervisor-designated television broadcast(s), the system automatically returns to the normal ratings profile but retains the set of override parameters for easy reimposition by the supervisor.

14 Claims, 4 Drawing Sheets

RATINGS CONTROL SYSTEM WITH TEMPORARY OVERRIDE CAPABILITY AND STORE-RECALL FEATURE

BACKGROUND

This invention relates to systems for blocking viewing or recording of television programs which exceed a ratings, spending limit, time restriction, or other viewing limitation set by a supervisor.

Video signal processing systems such as television tuners contained in television sets, video cassette recorders, or cable boxes which are suitable for coupling to a display device such as a picture tube and which contain circuitry and software designed to prevent viewing of programs containing ratings information below a level set by a supervisor, exceeding view time limits, and/or, in the case of pay-per-view systems, exceeding spending limits, are very well known. Such systems comprise a programmed processor which allows the supervisor with a password, usually a parent, to set limits which cause programs outside one or more of ratings, view time, or spending limits to be blocked and not viewable by the supervised person or group.

Ratings control is generally implemented by device or system that allows a supervisor to specify a rating limit, such as PG-13, and the processor in the television receiver containing a "stripper" (i.e., decoder) can "slice" (i.e., extract) auxiliary information from a program signal (e.g., Extended Data Services (XDS) data in the vertical blanking interval (VBI) of an NTSC television signal in the United States or PSIP data in an ATSC television signal) and decode the information to determine the content and rating of television programs and scenes and can compare the content and rating to the limits set by the supervisor. Spending control is generally implemented by the processor comparing the cost of a pay-per-view broadcast to a spending limit set by the supervisor. The processor within the receiver utilizes a "stripper" which functions to slice, or extract, ratings information and spending information contained in the television signal for most broadcast programs and channels. The processor is designed to blank the screen and mute the audio portion of the broadcast for programs outside the limits set by the supervisor. For television receivers which also have multi-image display capability (e.g., for displaying a main image representing one program and an auxiliary image representing a second program such as picture-in-picture (PIP) or picture-outside-picture (POP) systems), the receiver must provide ratings control for both main and auxiliary programs if both main and auxiliary pictures are displayed and the supervisor has activated ratings control.

The supervisor may also set a limit on the total viewing time for a period such as a day, week, weekend day, and the like, by entering selections in a profile for the supervised person, in which case the system processor counts the accumulated time that a profile has access to the system and terminates access when the limit is reached.

Some existing systems use multiple profiles, for example a profile for a younger child, a second profile for an older child, and a third profile for the parents. Each profile may have a different ratings limit and pay-per-view spending limits.

With currently available technology, in situations where the supervisor wishes to permit viewing of a particular television broadcast when the supervised person or group is not present, for example if the children are asleep and the parents wish to watch an NC-17-rated movie broadcast on cable TV, the supervisor must reset the ratings limit, set the profile to the parent profile (in a multiple profile system) or completely unlock the system using the password, and then after viewing the NC-17 rated movie, the more restrictive level must be reset so that the children's restriction limit is restored.

Due to the inconvenience of having to reset the ratings limit, view time limit, or spending limit and then having to remember to reset it to the normal limits, a system for temporarily overriding such limits has been invented and is disclosed in copending application entitled RATINGS CONTROL SYSTEM WITH TEMPORARY OVERRIDE CAPABILITY, application Ser. No. 09/475,448, filed on even date herewith, and hereafter referred to as "Override Invention." With the Override Invention, a supervisor may enter temporary overrides into the system, for example to permit a particular program to be viewed which is outside the normal limits. Such temporary override, for example after the special program has been broadcast, the Override Invention system deletes the override information.

SUMMARY OF THE INVENTION

An aspect of the invention involves recognizing that a control system providing an override feature would be more useful if the control system had capability to store completed or expired overrides and to recall them later.

Another aspect of the present invention comprises providing a video signal processing system such as a television receiver, cable box, or VCR tuner for producing an output signal suitable for coupling to a display device to produce a displayed image, the video processing system having a supervisor control system which blocks viewing of programs which are received with embedded ratings information or spending information which is outside a range selected by a supervisor, which permits the supervisor to temporarily modify a profile to enter a temporarily revised range or permit specific programs to be viewed, and which is capable of storing overrides in the system memory for later recall. As with the Override Invention, at the end of the temporary override period or completion of the specific programs permitted by the override, the system automatically restores the normal ratings, spending, and/or view time limits for the selected profile(s). However, according to this invention, the completed overrides are stored in system memory and are displayed in an on-screen list when the supervisor enters the viewer control routine.

The supervisor generally enters the viewer control routine by selecting an option from an on-screen menu with a remote control device, and responds successfully to an on-screen password challenge presented by the system. The user interface would then display the current control levels, such as ratings, view time, spending limits, and the like, and would display an option to override any of the current control levels. When the override option is selected by the supervisor, the supervisor can enter the override routine by selecting the override option.

Once the override routine is entered, the supervisor can choose to temporarily override the normal limits which had been previously stored in system memory, as with the Override Invention. Once an override is entered, it is preferably displayed on a list of active overrides. The override is shown on-screen as active until the time period is complete. The time period for the override is set by the supervisor, or is derived by the processor from the time a particular program is scheduled to be broadcast.

After the end of the time period, the system restores the normal limits and, according to the present invention, retains the override information in system memory for display and possible reuse by the supervisor. When the supervisor next enters the override routine, the stored completed override may be chosen by the supervisor in the event that the supervisor wants to repeat or reinstitute the same set of override parameters as was created in the past, or to base a new set of override parameters on a set which was used in the past and is listed on the display.

The storage of the override information may be either automatic or optional. In the optional embodiment, the supervisor may be given an option to name the set of override parameters, for example, "good behavior." In the automatic embodiment, the system saves each set of override parameters and displays them, or the most recently used ones, in a list when the supervisor enters the override menu.

As with the Override Invention, children and others who do not have the supervisory password can not change the profiles or temporarily override blocking and the supervisor who has entered the password accepted by the control system can enter (A) one or more specific broadcast programs to be unblocked, (B) one or more channels to be unblocked for one or more specific time periods, (C) a revised ratings profile for a specific time period, (D) a revised spending, and/or (E) a revised view time limit.

The present invention also comprises a method for blocking viewing or recording of television programs which are broadcast with ratings information or spending information which is outside a range selected by a supervisor comprising (A) receiving ratings, spending, and/or viewing time limits from a supervisor, (B) receiving one or more overrides from a supervisor which specify one or more permitted television programs, one or more permitted channels to be unblocked for one or more specific time periods, a revised ratings range for one or more specific time periods, and/or a modified viewing time limit, (C) blocking or permitting viewing or recording programs according to the limits and the overrides, and (D) storing overrides for use at a future time.

In another aspect, the invention comprises a ratings control system comprising means for a supervisor to override a ratings limit, spending limit, and/or viewing time limit, and means to store override information for future use.

Another aspect is a processor which normally blocks viewing of programs or recordings outside a viewer profile entered by a supervisor, which permits or denies viewing of programs according to temporary override(s) entered by the supervisor, and which returns to normal blocking profile after expiration of a time period set by the supervisor, or by removal of the override(s) by the supervisor, or after completion of the programs or recordings permitted in the temporary override(s) instructions, and which stores and recalls the override instructions for future use.

DETAILED DESCRIPTION OF THE INVENTION

The invention will be illustrated with respect to a preferred embodiment of the invention, but the invention should not be construed as limited thereto. For example, a television receiver will be illustrated, but the invention is also applicable to other types of video processing systems such as those with display devices such as television sets, and those without display devices such as direct broadcast satellite (DBS) signal receivers and video recorders (e.g., VCRs). In general, the invention applies to any system, apparatus, or device which employs ratings control, spending limits, view time limits and/or other criteria to permit or deny access to video or audio broadcasts or recordings.

Figure 1:
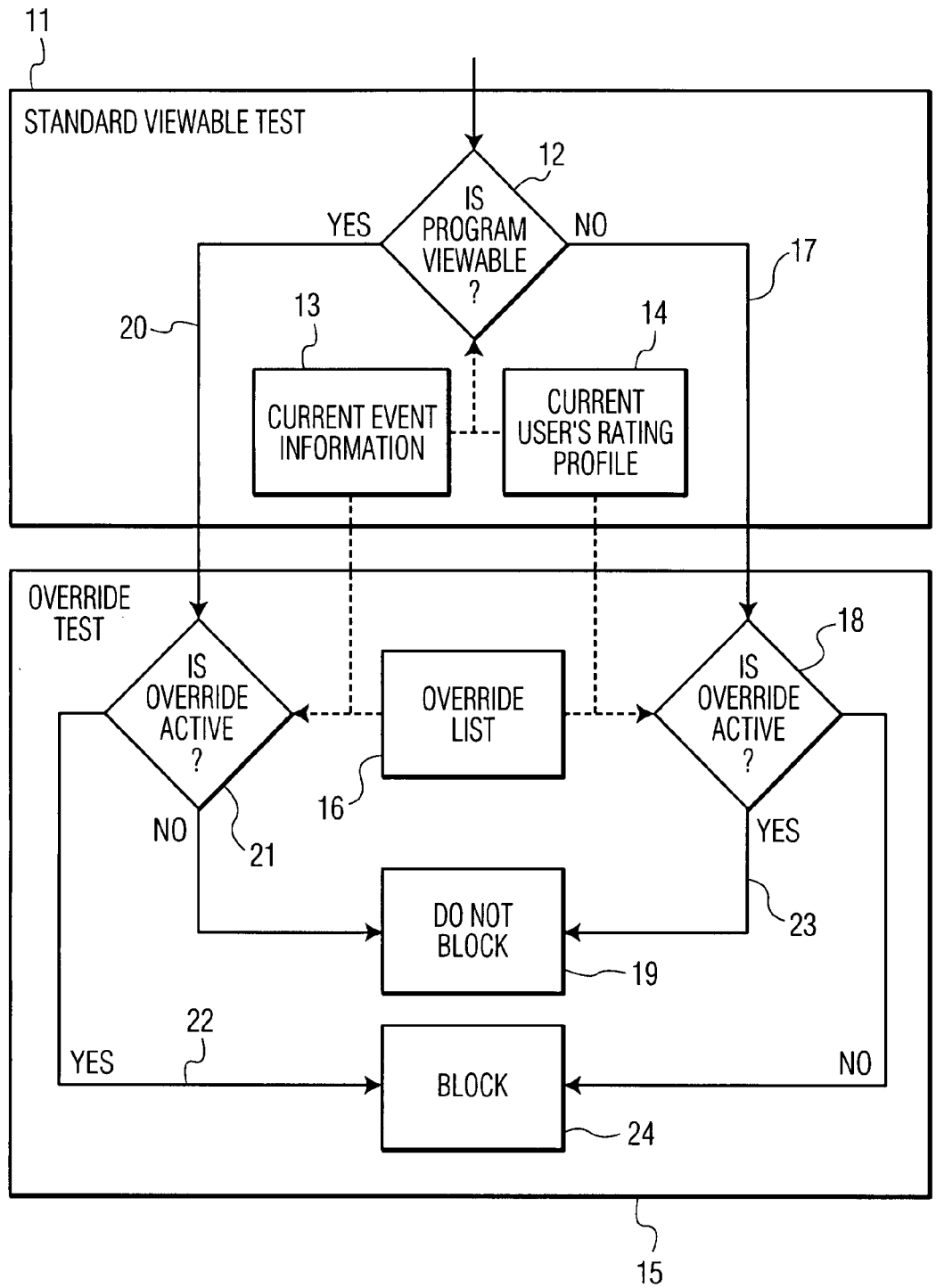
FIG. 1 shows, in block diagram form, a preferred system of the Override Invention disclosed in the copending patent application bearing Ser. No. PCT/US00/34148.

As shown in the block diagram in FIG. 1, the standard viewable test 11 is run by the processor to determine initially if the program is viewable 12. The processor receives both current event information 13 and the current user's rating profile 14 which has previously been entered by the supervisor who has the password. In a first example, the supervisor of the system who has the password wants to allow a certain program to be viewed by the child but the program's rating is above the allowed limit. The supervisor selects override and is challenged to enter the correct password to enter an override in the override list 16. The supervisor identifies the program, the start and stop time, and the profile in cases where the system allows alternative profiles.

The system displays a screen which calls for:

1) Program Identifier (for instance channel);

2) Start and Stop Time; and

3) Profile

When the television is tuned to a channel at the time the program is being broadcast and the system is set to the child's profile, the Standard determination based upon the program's rating and the child's profile rating limit occurs to determine if a program is viewable; in this example it is NOT 17 viewable. At this point according to the invention, the override is determined to be active 18 and the override logic is entered, and since the program matches the Program Identifier in the Override List Contents 16 and the system is within the Start and Stop Time for the program event and the current profile is the child profile, the Standard Decision to NOT 17 view this program is overridden 23 and the program is now viewable, i.e., unblocked 19. After the override expires it is removed from the active list and stored in a completed override list 31 (FIG. 3) or its status is changed by the system to "completed" or "expired," for example. Other exemplary scenarios for operation of an override system in accordance with FIG. 1 are set forth in the copending patent application bearing Ser. No. PCT/US00/34148 which discloses the Override Invention.

The present invention, which is an improvement to the Override Invention, provides for efficient recall and reinstitution of overrides.

Figure 2:
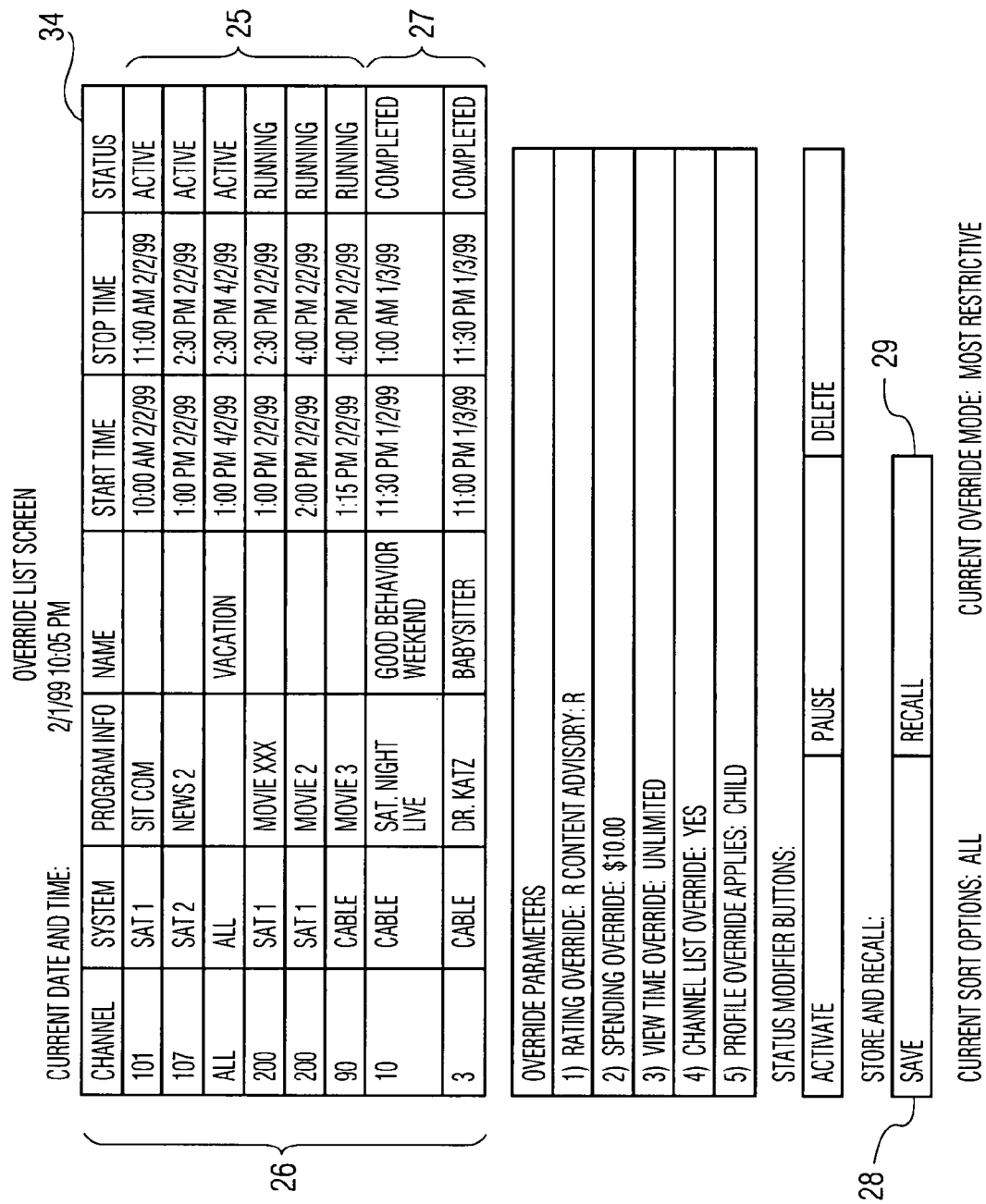
FIG. 2 shows an embodiment of an override list screen which can be displayed by the system of the invention

Referring now to FIG. 2, the system preferably stores the override in a separate list 26 and displays a list of the currently in force overrides 25 and the most recently used overrides 27, listing by event in the form of a guide as shown in FIG. 2. The storage in the recently used override list could be automatic or non-expired overrides could be manually selected for inclusion in the stored override list. Any number of recently used overrides can be stored and displayed, with ten being a reasonable number to store and display, although greater or lesser numbers of previously used overrides could also be stored. For systems which require or offer manual selection of overrides for inclusion in the list, events in the guide could be highlighted and an override save button 28 would be pressed. This would enter the program into the override list, subject to modification or updating by the supervisor. For example, if a program at a certain time on a certain date was selected for unblocking, when that program is recalled from the completed override list by highlighting the override in the list and then selecting recall 29. A new date may be required to be entered by the supervisor.

When an override has been programmed, according to one embodiment it could be identified by name and the supervisor can store it in memory for recall later. For instance if on Saturday nights the parent wants to change spending limit to $10 and movie rating limit to R from normal PG-13, he could bring up the "Good Behavior" override and change the date to this Saturday and press "activate." He could recall this override and activate it when needed.

Different sorting options on the override list could be offered, for example by channel, by date, by profile, etc. For example, when Status 34 is highlighted at the top of the right column in FIG. 2, then the entries can be automatically sorted by the system microprocessor to list Active entries first, Running entries second, and Completed entries third. When an override entry in the list is highlighted then the Override Parameters would be updated based upon the override data stored in the override list.

The items in the Override Parameters List could be highlighted and edited from this screen or a dialog could be brought up based upon which parameter is highlighted, and a detailed editing screen could be displayed. When Ratings are selected, a dialog which includes the content advisory bits such as Violence could be displayed.

Store and Recall would provide a method for storing selected entries of the override list for recall and activation at a later time. For instance, an override to unblock spending for Good Behavior Weekend could be recalled and activated at the appropriate time by the Supervisor. The next weekend the supervisor could recall this named override and re-apply it to the current weekend.

Figure 3:
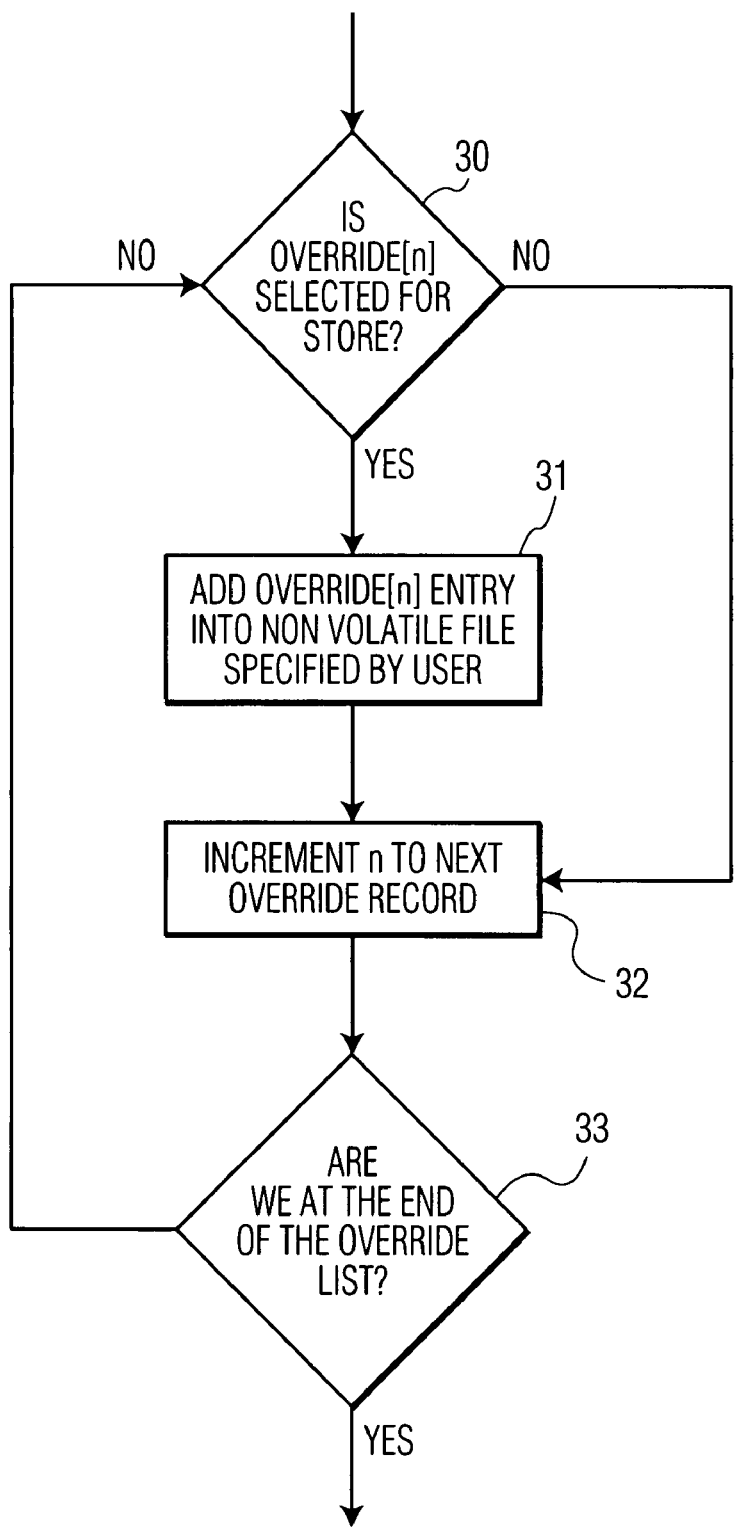
FIG. 3 shows, in block diagram form, an embodiment of the override list store logic of the system of the invention.

Referring now to FIG. 3, the system microprocessor logic first determines whether an override has been selected 30, and then allows the storage option to be selected by the supervisor, in which case the Override entry is added to a non-volatile file in memory 31, otherwise the logic moves the on-screen display cursor or highlight bar to the next override record and tests 32 as to whether there are further entries in the override list. If there are none, block 33 returns a Yes and the store logic is exited. If there are additional entries, block 33 returns a No and the logic returns to override selected for storage test 30.

Figure 4:
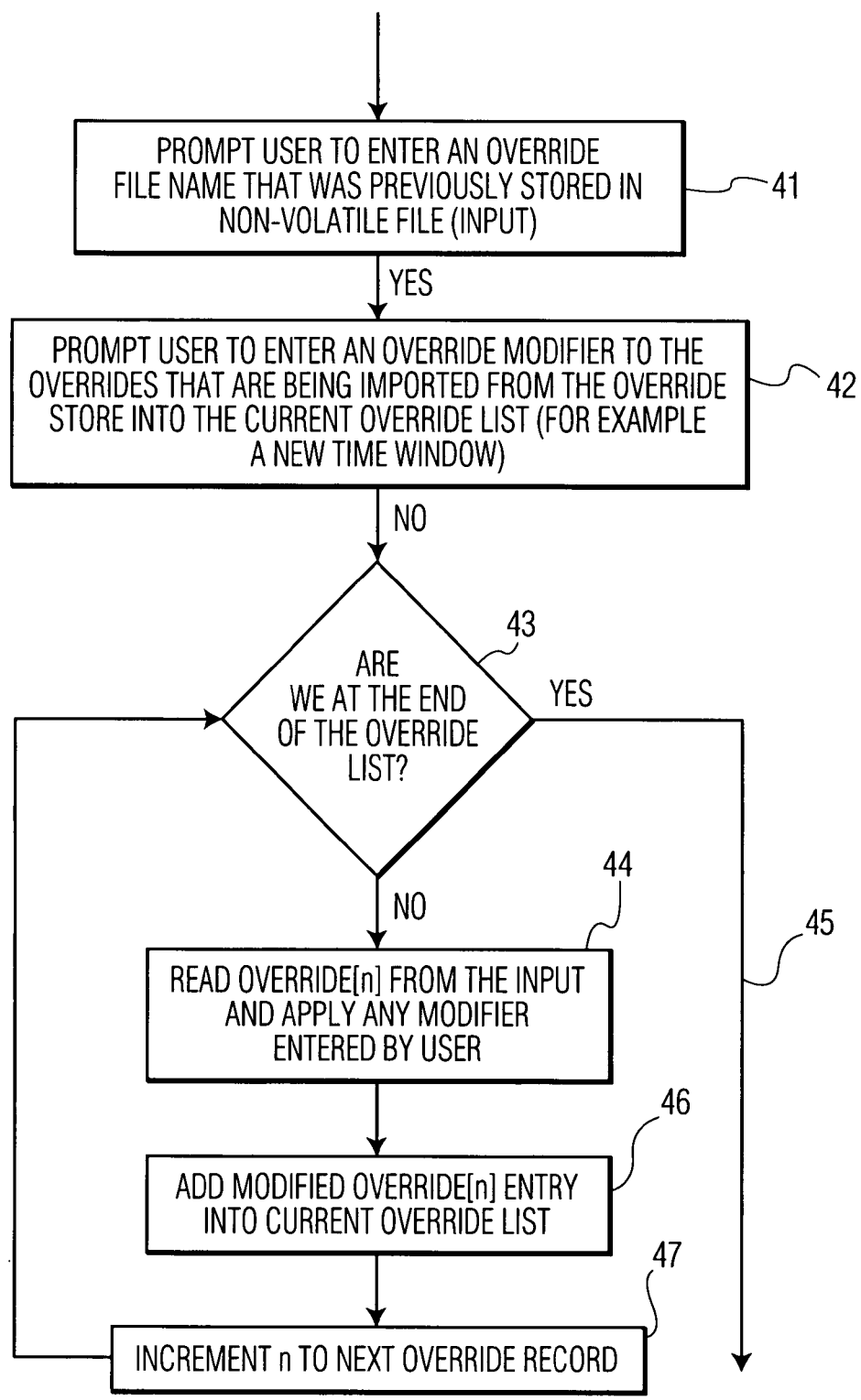
FIG. 4 shows, in block diagram form, an embodiment of the override recall logic of the system of the invention.

Referring now to FIG. 4, when the supervisor selects Override from the on-screen display, the system logic first prompts 41 the supervisor to enter a previously named override entry stored in non-volatile memory. If such an entry is selected, the microprocessor logic causes the system to prompt the supervisor to edit the override 42, particularly with respect to the new date since the previously used override would have a date parameter which is in the past. The recall logic then moves to block 43 wherein the system tests whether there are any more items in the stored list of completed overrides, and if so, i.e., if the end of the list has not been reached, moves the cursor or highlighting to the next one 44, wherein a new date can be entered and the modified entry can be stored 46 in the current override list, and the cursor or highlighting is moved 47 to the next entry, or the override routine is exited 45 and any new or modified overrides are stored.

As can be seen from this detailed description, this invention is an improvement to the related Override Invention in that it can save the supervisor time and make it more convenient to deal with a sophisticated viewer control system which blocks viewing of programs which exceed limits pertaining to ratings, view time, or spending by making it more convenient to temporarily override the normal limits, and to have access and ability to repeat such overrides when the occasion warrants it. Parents who have children who are able to turn on a television, VCR, digital subscriber line, satellite dish, or any of the many types of entertainment systems which are currently, or in the future will become, available, will find this invention as particularly useful since it is difficult to remember to reset the previously set limits when the parent wishes to view a particular program, or when there are special reasons to make exceptions to the normal blocking profile. This invention will allow the parents to very conveniently make such exceptions, not have to worry about resetting the normal limits after the program is over, and to store the exception or override for easy recall and reuse the next time the special reason occurs again.

While this invention has been illustrated and explained in sufficient detail so that those skilled in this art can readily make and use it, various alternatives, modifications, and improvements which are within the scope and spirit of the invention should become apparent.

The invention claimed is:

1. A system for controlling television images, the system comprising:
   at least one viewer profile establishing a set of limits for blocking selected images from viewing or recording;
   at least one member of said set selected from the group comprising: program ratings, spending, channel, total view time, time of day, image content ratings;
   at least one override list including at least one override instruction applicable to at least one member of said set such that said at least one member is modified while said override instruction is active;
   at least one previously used override list including at least one previously used override instruction wherein said previously used override instruction is able to be recalled for use in setting a new override instruction; and
   a memory for storing said at least one previously used override list.

2. The system of claim 1 wherein said override list includes a set of override parameters to be applied to said viewer profile.

3. The system of claim 2 wherein at least one of said override parameters is selected from the group comprising: program ratings, time of day, channel, total view time, scene ratings, spending.

4. The system of claim 1 including means to display to a viewer a status of said override list.

5. The system of claim 1 including means to display to a viewer a status of at least one of said override parameters.

6. The system of claim 1 including at least one apparatus selected from the group comprising: television receiver, cable box, video cassette recorder (VCR) tuner.

7. A television image control system comprising:
   at least one viewer profile establishing a set of limits for blocking images outside said limits from viewing or recording by a corresponding viewer;

at least one of said limits selected from the list comprising: program ratings, spending, channel, total view time limits, time of day limits, image content ratings;

at least one override list including at least one override instruction applicable to said at least one viewer profile for modifying at least one of said limits;

at least one previously used override list including at least one previously used override instruction wherein said previously used override instruction is able to be recalled for use in setting a new override instruction; and a memory for storing said at least one previously used override list.

8. The system of claim 7 wherein said limits modified in accordance with said override list are selected from the group comprising: program, channel, scene, program rating, scene rating, spending limits, total view time and time period.

9. A system comprising:

video signal processing means for producing an output signal suitable for coupling to a display device to produce images;

blocking means coupled to said video signal processing means, said blocking means for blocking said images in accordance with a profile set by a supervisor, said blocking means including:

at least one override list applicable to said profile such that images blocked in accordance with said profile are unblocked in accordance with said override list;

at least one previously used override list including at least one previously used override instruction wherein said previously used override instruction may be recalled for use in setting a new override instruction; and a memory for storing said at least one previously used override list.

10. The system of claim 9 further comprising memory means for storing at least one of said override instructions.

11. The system of claim 10 wherein said system automatically stores at least one override instruction in said memory means.

12. A method for controlling television images comprising the steps of:

establishing at least one viewer profile for blocking images from a corresponding viewer based on limits selected from the group comprising: program ratings, spending, channel, total view time, time of day, image content ratings;

creating at least one override list including override instructions applicable to said at least one viewer profile for modifying selected ones of said limits;

storing said at least one previously used override list including at least one previously used override instruction in a memory; and recalling from memory said previously used override list for use in setting a new override instruction.

13. A method for controlling viewing of video images comprising the steps of:

coupling video processing circuitry to a display device so as to provide video images for display to at least one viewer;

providing parental control circuitry for blocking at least a portion of said video images from being displayed to a viewer in accordance with a corresponding viewer profile;

creating at least one override list comprising override instructions applicable to said video processing circuitry so as to unblock selected blocked video images;

storing said at least one previously used override list in memory; wherein said at least one previously used override list includes at least one previously used override instruction; and recalling from memory said previously used override list for use in setting a new override instruction.

14. The method of claim 13 including a step of recalling at least one override list from said memory.

* * * * *